(12) United States Patent
Yagihashi et al.

(10) Patent No.: US 11,286,051 B2
(45) Date of Patent: Mar. 29, 2022

(54) AERIAL VEHICLE SAFETY APPARATUS AND AERIAL VEHICLE

(71) Applicant: NIPPON KAYAKU KABUSHIKI KAISHA, Chiyoda-ku (JP)

(72) Inventors: Yasuhiko Yagihashi, Himeji (JP); Hiroshi Nakamura, Himeji (JP); Koichi Sasamoto, Himeji (JP); Dairi Kubo, Himeji (JP); Takahiro Ooi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 108 days.

(21) Appl. No.: 16/640,484

(22) PCT Filed: Jun. 19, 2018

(86) PCT No.: PCT/JP2018/023359
§ 371 (c)(1),
(2) Date: Feb. 20, 2020

(87) PCT Pub. No.: WO2019/039063
PCT Pub. Date: Feb. 28, 2019

(65) Prior Publication Data
US 2020/0216181 A1 Jul. 9, 2020

(30) Foreign Application Priority Data

Aug. 24, 2017 (JP) .............................. JP2017-161388
Feb. 8, 2018 (JP) .............................. JP2018-021312

(51) Int. Cl.
*B64D 17/72* (2006.01)
*B64D 17/80* (2006.01)
(Continued)

(52) U.S. Cl.
CPC ......... *B64D 17/725* (2013.01); *B64D 17/025* (2013.01); *B64D 17/80* (2013.01);
(Continued)

(58) Field of Classification Search
CPC ..... B64D 17/025; B64D 17/72; B64D 17/725
See application file for complete search history.

(56) References Cited

U.S. PATENT DOCUMENTS 1,189,112 A * 6/1916 Howorth ................ B64D 17/72
244/146
1,337,788 A * 4/1920 Mott ...................... B64D 17/72
244/146

(Continued)

FOREIGN PATENT DOCUMENTS

DE 19647624 A1 * 6/1997 ........... B64D 17/025
EP 0129026 A1 * 12/1984 ........... B64D 17/025
(Continued)

OTHER PUBLICATIONS

International Search Report dated Jul. 24, 2018 in PCT/JP2018/023359 filed Jun. 19, 2018, 2 pages.
(Continued)

*Primary Examiner* — Joseph W Sanderson
(74) *Attorney, Agent, or Firm* — Oblon, McClelland, Maier & Neustadt, L.L.P.

(57) ABSTRACT

An aerial vehicle safety apparatus includes an expandable object, an ejection apparatus, a bag-shaped member, and a gas generator. The expandable object is wound or folded in a non-expanded state and generates at least any of lift and buoyancy in an expanded state. The ejection apparatus is coupled to the expandable object by a coupling member and ejects the non-expanded expandable object into air. The bag-shaped member is provided in the expandable object and wound or folded together with or separately from the (Continued)

non-expanded expandable object, and expands the non-expanded expandable object by at least partially being inflated like a tube. The gas generator is provided in the expandable object and inflates the bag-shaped member by causing gas generated at the time of activation to flow into the bag-shaped member.

13 Claims, 11 Drawing Sheets

(51) Int. Cl.
*B64D 17/02* (2006.01)
*B64C 39/02* (2006.01)

(52) U.S. Cl.
CPC ...... *B64C 39/024* (2013.01); *B64C 2201/185* (2013.01); *B64D 2201/00* (2013.01)

(56) References Cited

U.S. PATENT DOCUMENTS

| | | | | |
|---|---|---|---|---|
| 1,840,618 | A * | 1/1932 | Castner | B64D 17/72 244/146 |
| 1,861,784 | A * | 6/1932 | Brown | B64D 17/72 244/138 R |
| 4,105,173 | A * | 8/1978 | Bucker | A62B 1/22 182/3 |
| 5,244,169 | A * | 9/1993 | Brown | B64D 17/025 244/123.11 |
| 5,303,883 | A | 4/1994 | Brewer et al. | |
| 5,362,017 | A * | 11/1994 | Puckett | B64D 17/025 244/145 |
| 5,992,794 | A | 11/1999 | Rotman et al. | |
| 6,565,042 | B1 | 5/2003 | Yamada | |
| 6,705,572 | B1 * | 3/2004 | Christopher | B64D 17/72 244/142 |
| 8,403,268 | B2 * | 3/2013 | Suze | B64D 17/64 244/149 |
| 9,147,940 | B2 | 9/2015 | Yahagi et al. | |
| 9,613,539 | B1 | 4/2017 | Lindskog et al. | |
| 10,096,255 | B1 | 10/2018 | Lindskog et al. | |
| 10,427,781 | B2 | 10/2019 | Sugaki et al. | |
| 10,737,794 | B2 * | 8/2020 | Lee | B64C 39/02 |
| 10,787,268 | B2 * | 9/2020 | Leidich | B64D 17/40 |
| 2003/0094544 | A1 | 5/2003 | Yamada | |
| 2009/0134277 | A1 * | 5/2009 | Kim | A62B 1/00 244/149 |
| 2010/0181421 | A1 | 7/2010 | Albagli et al. | |
| 2012/0049005 | A1 * | 3/2012 | Suh | B64D 17/70 244/145 |
| 2014/0118178 | A1 | 5/2014 | Yahagi et al. | |
| 2015/0314881 | A1 | 11/2015 | Tsaliah et al. | |
| 2016/0221681 | A1 | 8/2016 | Babovka et al. | |
| 2016/0264248 | A1 * | 9/2016 | MacCallum | B64D 17/62 |
| 2017/0139803 | A1 | 5/2017 | Maheshwari et al. | |
| 2017/0233086 | A1 | 8/2017 | Homan et al. | |
| 2017/0233087 | A1 | 8/2017 | Homan et al. | |
| 2017/0233088 | A1 | 8/2017 | Homan et al. | |
| 2017/0313433 | A1 | 11/2017 | Ozaki | |
| 2018/0111695 | A1 | 4/2018 | Homan et al. | |
| 2018/0134379 | A1 | 5/2018 | Sugaki et al. | |
| 2018/0244394 | A1 * | 8/2018 | Lee | B64C 39/024 |
| 2020/0115049 | A1 * | 4/2020 | Nakamura | B64D 17/725 |
| 2020/0198790 | A1 * | 6/2020 | Yagihashi | B64C 39/024 |
| 2020/0339278 | A1 * | 10/2020 | Nakamura | B64D 17/72 |

FOREIGN PATENT DOCUMENTS

| | | |
|---|---|---|
| EP | 0 869 058 A2 | 10/1998 |
| EP | 3 050 805 A1 | 8/2016 |
| JP | 48-104300 | 12/1973 |
| JP | 50-14320 | 5/1975 |
| JP | 60-203598 A | 10/1985 |
| JP | 3-114497 U | 11/1991 |
| JP | 4-3898 U | 1/1992 |
| JP | 2001-120848 A | 5/2001 |
| JP | 2003-154020 A | 5/2003 |
| JP | 2005-323811 A | 11/2005 |
| JP | 2006-122374 A | 5/2006 |
| JP | 2007-83837 A | 4/2007 |
| JP | 2016-88111 A | 5/2016 |
| WO | WO 2013/008514 A1 | 1/2013 |
| WO | WO 2014/080409 A1 | 5/2014 |
| WO | WO 2016/171120 A1 | 10/2016 |

OTHER PUBLICATIONS

International Search Report dated Jul. 17, 2018 in PCT/JP2018/023358 (with English Translation), 4 pages.

Extended European Search Report dated Apr. 16, 2021 in corresponding European Patent Application No. 18848611.2, 8 pages.

Extended European Search Report dated Apr. 29, 2021 in corresponding European Patent Application No. 18848766.4, 7 pages.

* cited by examiner (A)

(B)

AERIAL VEHICLE SAFETY APPARATUS AND AERIAL VEHICLE

TECHNICAL FIELD

The present invention relates to an aerial vehicle represented, for example, by a drone and an aerial vehicle safety apparatus attached to the aerial vehicle.

BACKGROUND ART

Various aerial vehicles have conventionally been known. The aerial vehicle includes not only a manned aircraft such as a passenger aircraft or a helicopter but also an unmanned aircraft. In particular, with recent development of an autonomous control technology and a flight control technology, industrial applications of an unmanned aircraft such as a drone have increasingly been expanded.

A drone includes, for example, a plurality of rotors, and flies by rotating the plurality of rotors simultaneously in a balanced manner. At that time, ascent and descent are done by uniformly increasing or decreasing the number of rotations of the plurality of rotors, and movement forward and rearward is done by inclining an airframe by individually increasing or decreasing the number of rotations of each of the plurality of rotors. It is expected that such an unmanned aircraft will more increasingly be used worldwide in the future.

A falling accident of an unmanned aircraft, however, has been feared, which has interfered widespread use of the unmanned aircraft. In order to lower the possibility of such a falling accident, a parachute apparatus for an unmanned aircraft as a safety apparatus has been put into practical use. Such a parachute apparatus for an unmanned aircraft lessens impact at the time of landing by lowering a speed of the unmanned aircraft by using an expanded parachute in the event of falling of the unmanned aircraft.

Japanese Patent Laying-Open No. 2003-154020 (PTL 1) discloses an emergency parachute apparatus in which a parachute thereof is higher in speed of expansion than a normal parachute apparatus such that the parachute apparatus can be used for escape of people from higher floors of a building in such disasters as earthquake or fire. The emergency parachute apparatus includes a parachute provided with a gas generator and the speed of expansion of the parachute is significantly increased by allowing gas generated by activation of the gas generator to flow into a space in the parachute.

CITATION LIST

Patent Literature

PTL 1: Japanese Patent Laying-Open No. 2003-154020

SUMMARY OF INVENTION

Technical Problem

In connection with an aerial vehicle safety apparatus like a parachute apparatus for an unmanned aircraft described above, an aerial vehicle that flies at an altitude lower than high floors of a building depending on applications is also assumed as an aerial vehicle to which the aerial vehicle safety apparatus is attached. Therefore, even if a parachute provided with a gas generator as disclosed in PTL 1 is applied to the aerial vehicle safety apparatus, expansion of the parachute may be too late, and further reduction in time period for expanding the parachute has been demanded.

According to the disclosure in PTL 1, a large amount of gas is required for expanding a parachute. Therefore, when a gas generator of an explosive type or a stored type is employed, a pressure-resistant container in which a large amount of gas generating agent or compressed gas is sealed is required. In order to realize this, a housing made of a metal high in strength and large in thickness should be employed as a pressure-resistant container, which inevitably leads to an apparatus unrealistically high in cost and heavy in weight.

When a large amount of gas generating agent is used, melt or burning of a fabric of a parachute due to heat generated by burning of the gas generating agent is a concern. Since a heat resistant material should be used for a fabric or the entire fabric should be coated with a heat resistant coating, the parachute itself is also disadvantageously high in cost and heavy in weight.

Such a problem similarly arises also in providing a paraglider instead of a parachute in an aerial vehicle or providing an air bag in an aerial vehicle.

The present invention was made to solve the problems described above, and an object thereof is to provide an aerial vehicle safety apparatus capable of expanding an expandable object such as a parachute, a paraglider, or an air bag in a short period of time and an aerial vehicle including the same.

Solution to Problem

An aerial vehicle safety apparatus based on a first aspect of the present invention is attachable to an aerial vehicle, and the aerial vehicle safety apparatus includes an expandable object, an ejection apparatus, a bag-shaped member, and a gas generator. The expandable object is wound or folded in a non-expanded state and capable of generating at least one of lift and buoyancy in an expanded state. The ejection apparatus is coupled to the expandable object with a coupling member being interposed and serves to eject the non-expanded expandable object into air. The bag-shaped member is provided in the expandable object and wound or folded together with or separately from the non-expanded expandable object and expands the non-expanded expandable object by at least partially being inflated like a tube. The gas generator is provided in the expandable object and inflates the bag-shaped member by causing gas generated at the time of activation to flow into the bag-shaped member.

The expandable object in the aerial vehicle safety apparatus based on the first aspect of the present invention is capable of generating at least one of lift and buoyancy in an expanded state as described above and it suitably includes a parachute or a paraglider.

Many parachutes have a fabric in a shape of an umbrella, and the parachute is connected to an aerial vehicle to be protected through a coupling member (which is generally referred to as a cord or a line) and lowers a speed of the aerial vehicle by using air resistance. Examples of the parachute include a parachute including a single chute, a parachute including a string of chutes identical in shape, and a parachute including a string of chutes different in shape. Examples of the parachute further include a parachute including a chute having a closed center (that is, without a hole) and a parachute including a chute provided with a hole called a spill hole in the center. A specific form of the parachute can be selected as appropriate in consideration of various purposes such as mitigation of shock at the time of expansion of the parachute, adjustment of a rate of descent, or resistance against influence by disturbance such as wind.

A paraglider is in a shape like a wing having an aspect ratio approximately not lower than one, and it is connected to an aerial vehicle to be protected through a coupling member (which is generally referred to as a cord or a line). The paraglider has a steering cord called a brake cord connected to left and right ends of the wing. By pulling the brake cord, various stresses applied to a cross-section of the wing can be varied and consequently, gliding, turning, and rapid deceleration can be done. Therefore, the paraglider can do gliding, turning, and rapid deceleration which cannot be done by a parachute. A Rogallo paraglider and a triangular paraglider are also available as similarly constructed paragliders. In order to maintain the shape of the wing by using ram air, a paraglider with an air intake (an air inlet which will be described later) is in the mainstream, however, there is a paraglider without an air intake. In order to fly in a stable manner, a paraglider with an air intake is more preferably used. From a point of view of reduction in weight, a single surface paraglider (that is, a paraglider without an air intake) is preferably used. Furthermore, a paraglider of a type capable of flying by forcibly obtaining propelling force by separately providing a propulsive apparatus such as a propeller may be used.

In the aerial vehicle safety apparatus based on the first aspect of the present invention, the bag-shaped member may include a plurality of tubular portions formed radially or in grids.

In the aerial vehicle safety apparatus based on the first aspect of the present invention, the expandable object may have a two-dimensionally elongated shape in an expanded state. In that case, preferably, the bag-shaped member is disposed to extend along a longitudinal direction of the expanded expandable object. The expandable object having the two-dimensionally elongated shape in the expanded state normally includes a paraglider.

In the aerial vehicle safety apparatus based on the first aspect of the present invention, the expandable object may include a wing-shaped member containing a plurality of air chambers and a plurality of air inlets provided in a front portion so as to correspond to respective ones of the plurality of air chambers. In that case, preferably, the bag-shaped member is disposed inside or outside the expandable object to extend along the vicinity of a portion of the expandable object where the plurality of air inlets are provided. The expandable object containing a plurality of air chambers normally includes a paraglider with an air intake.

An aerial vehicle safety apparatus based on a second aspect of the present invention is attachable to an aerial vehicle, and the aerial vehicle safety apparatus includes an expandable object, an ejection apparatus, and a shape restorable member. The expandable object is wound or folded in a non-expanded state and capable of generating at least one of lift and buoyancy in an expanded state. The ejection apparatus is coupled to the expandable object with a coupling member being interposed and serves to eject the non-expanded expandable object into air. The shape restorable member is provided in the expandable object and wound or folded together with or separately from the non-expanded expandable object, and expands the non-expanded expandable object by restoring an initial shape by elastic force or shape resilience owing to shape memory.

The expandable object in the aerial vehicle safety apparatus based on the second aspect of the present invention is capable of generating at least one of lift and buoyancy in an expanded state as described above and it suitably includes a parachute or a paraglider. The expandable object in the aerial vehicle safety apparatus based on the second aspect of the present invention is similar to the expandable object in the aerial vehicle safety apparatus based on the first aspect of the present invention.

In the aerial vehicle safety apparatus based on the second aspect of the present invention, the shape restorable member may include an elastic member. In that case, the aerial vehicle safety apparatus based on the second aspect of the present invention preferably further includes a locking member that maintains the shape restorable member in a wound or folded state. In this case, the shape restorable member restores the initial shape by cancellation of locking of the shape restorable member by the locking member by application of external force or energy.

The aerial vehicle safety apparatus based on the second aspect of the present invention may further include a gas generator that cancels locking of the shape restorable member by the locking member by making use of a gas pressure generated at the time of activation or thermal energy generated at the time of activation.

In the aerial vehicle safety apparatus based on the second aspect of the present invention, the shape restorable member may include a shape memory member that restores an original shape by being heated. In that case, the aerial vehicle safety apparatus based on the second aspect of the present invention preferably further includes a gas generator that heats the shape restorable member by making use of thermal energy generated at the time of activation.

The aerial vehicle safety apparatus based on the first and second aspects of the present invention may further include a control mechanism that controls an operation of the gas generator to start expansion of the expandable object after start of ejection of the expandable object by the ejection apparatus.

In the aerial vehicle safety apparatus based on the first and second aspects of the present invention, the gas generator may be of an explosive type containing an igniter. In that case, preferably, the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent. In this case, the control mechanism includes the delay charge.

The delay charge is composed, for example, of a composition serving to transmit thermal energy converted in the igniter from electric energy input to the igniter to the combustion agent with a time lag while maintaining the thermal energy. Normally, the delay charge is composed of an oxidizer composed of at least one composition selected from the group consisting of various oxides and various peroxides and a reducing agent composed of at least one composition selected from the group consisting of various simple substances of metal, various metal nitrides, various metal silicon compounds, various metal fluorine compounds, various metal sulfides, and various metal phosphorus compounds.

In the aerial vehicle safety apparatus based on the first and second aspects of the present invention, the gas generator may be of an explosive type containing an igniter. In that case, the control mechanism may include an activation delay mechanism that activates the gas generator after lapse of a prescribed time period since activation of the ejection apparatus.

The aerial vehicle safety apparatus based on the first and second aspects of the present invention may further include an electric circuit that supplies electric power for activating the gas generator. In that case, the electric circuit preferably includes a power supply and a switch that switches on and off the power supply. In this case, the activation delay mechanism includes the electric circuit and a switch controller that controls the switch.

In the aerial vehicle safety apparatus based on the first and second aspects of the present invention, preferably, the switch includes a positive electrode plate, a negative electrode plate opposed to the positive electrode plate, and an insulator removably interposed between the positive electrode plate and the negative electrode plate, and the switch controller includes a string member having one end coupled to the insulator and the other end coupled to the ejection apparatus or the aerial vehicle. In this case, the power supply is switched from off to on as the ejection apparatus ejects the expandable object, the string member pulls the insulator to pull out the insulator from between the positive electrode plate and the negative electrode plate, and the positive electrode plate and the negative electrode plate come in contact with each other.

In the aerial vehicle safety apparatus based on the first and second aspects of the present invention, a length between the one end of the string member coupled to the insulator and the other end of the string member coupled to the ejection apparatus or the aerial vehicle is preferably variably adjustable.

An aerial vehicle safety apparatus based on a third aspect of the present invention is attachable to an aerial vehicle, and the aerial vehicle safety apparatus includes an air bag as an expandable object, a bag-shaped member, and a gas generator. The air bag is wound or folded in a non-expanded state and serves as a cushion in an expanded state. The bag-shaped member is provided in the air bag and wound or folded together with or separately from the non-expanded air bag, and expands the non-expanded air bag by at least partially being inflated like a tube. The gas generator inflates the bag-shaped member by causing gas generated at the time of activation to flow into the bag-shaped member.

An aerial vehicle safety apparatus based on a fourth aspect of the present invention is attachable to an aerial vehicle, and the aerial vehicle safety apparatus includes an air bag as an expandable object and a shape restorable member. The air bag is wound or folded in a non-expanded state and serves as a cushion in an expanded state. The shape restorable member is provided in the air bag and wound or folded together with or separately from the non-expanded air bag, and expands the non-expanded air bag by restoring an initial shape by elastic force or shape resilience owing to shape memory.

An aerial vehicle based on the present invention includes an airframe, a propulsive mechanism that is provided in the airframe and propels the airframe, and the aerial vehicle safety apparatus based on the first to fourth aspects of the present invention described above, and the aerial vehicle safety apparatus is attached to the airframe.

Advantageous Effects of Invention

According to the present invention, an aerial vehicle safety apparatus capable of expanding an expandable object such as a parachute, a paraglider, or an air bag in a short period of time and an aerial vehicle including the same can be provided.

DESCRIPTION OF EMBODIMENTS

Embodiments of the present invention will be described in detail below with reference to the drawings. The embodiments and modifications thereof shown below illustrate application of the present invention to a drone representing an unmanned aircraft as an aerial vehicle.

First Embodiment

An aerial vehicle safety apparatus provided with a paraglider as an expandable object and an aerial vehicle including the same will initially be described as a first embodiment.

Figure 1:
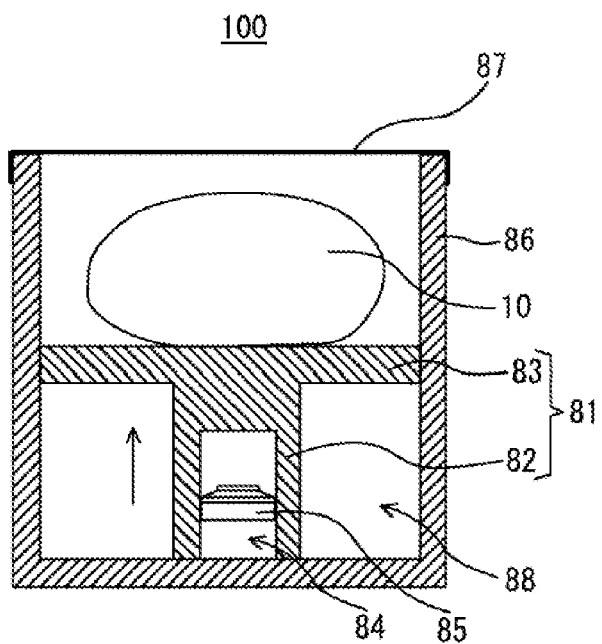
FIG. 1 is a schematic cross-sectional view of an aerial vehicle safety apparatus according to a first embodiment.

FIG. 1 is a schematic cross-sectional view of an aerial vehicle safety apparatus 100 according to the first embodiment. As shown in FIG. 1, aerial vehicle safety apparatus 100 according to the present embodiment includes an actuator 88 as an ejection apparatus and a paraglider 10 as an expandable object. Actuator 88 includes an igniter 84 including a cup-shaped case 85 that accommodates an ignition agent (not shown), a piston 81 including a recess 82 and a piston head 83 formed integrally with recess 82, and a cylindrical housing 86 with bottom that accommodates piston 81 and restricts a direction of propulsion of piston 81.

Paraglider 10 is stored in housing 86 in a non-expanded state as being arranged on piston head 83. By propelling piston 81 in such a construction, paraglider 10 can directly be driven out and expanded. An opening end of housing 86 is closed by a lid 87 in an initial state, and lid 87 is removed from the opening end as paraglider 10 is driven out.

When an abnormal condition is detected by an abnormality detector (not shown) such as an acceleration sensor, piston 81 is propelled by a gas pressure generated based on an ignition operation by igniter 84. Paraglider 10 is thus directly driven out by propelling power of piston 81. Though not shown, paraglider 10 is connected to housing 86 by a coupling member (line), and the paraglider is constructed so as to suspend an aerial vehicle 30 which will be described later through the coupling member (line) after the paraglider is expanded.

Figure 2:
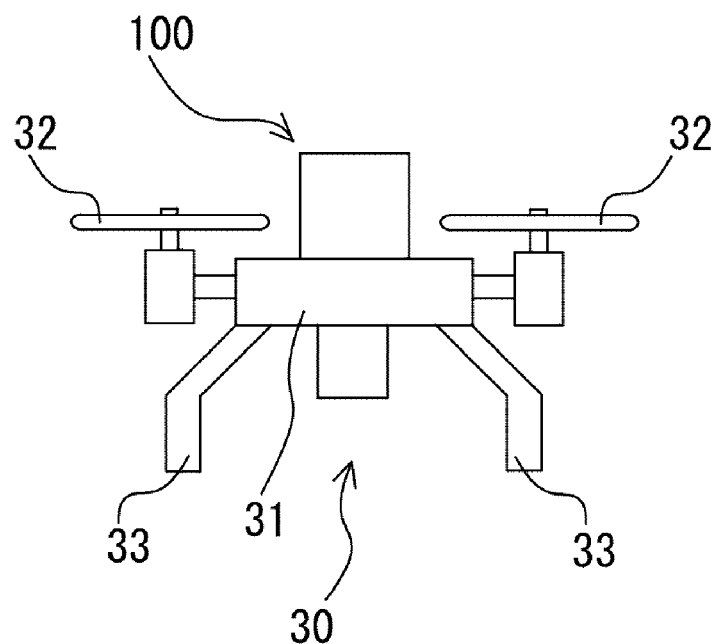
FIG. 2 is a schematic front view of an aerial vehicle including the aerial vehicle safety apparatus shown in FIG. 1.

FIG. 2 illustrates aerial vehicle 30 including aerial vehicle safety apparatus 100. Aerial vehicle 30 includes an airframe 31, aerial vehicle safety apparatus 100 attached to airframe 31, at least one propulsive mechanism (for example, a propeller) 32 provided in airframe 31 and propelling airframe 31, and a plurality of legs 33 provided under airframe 31.

Figure 3:
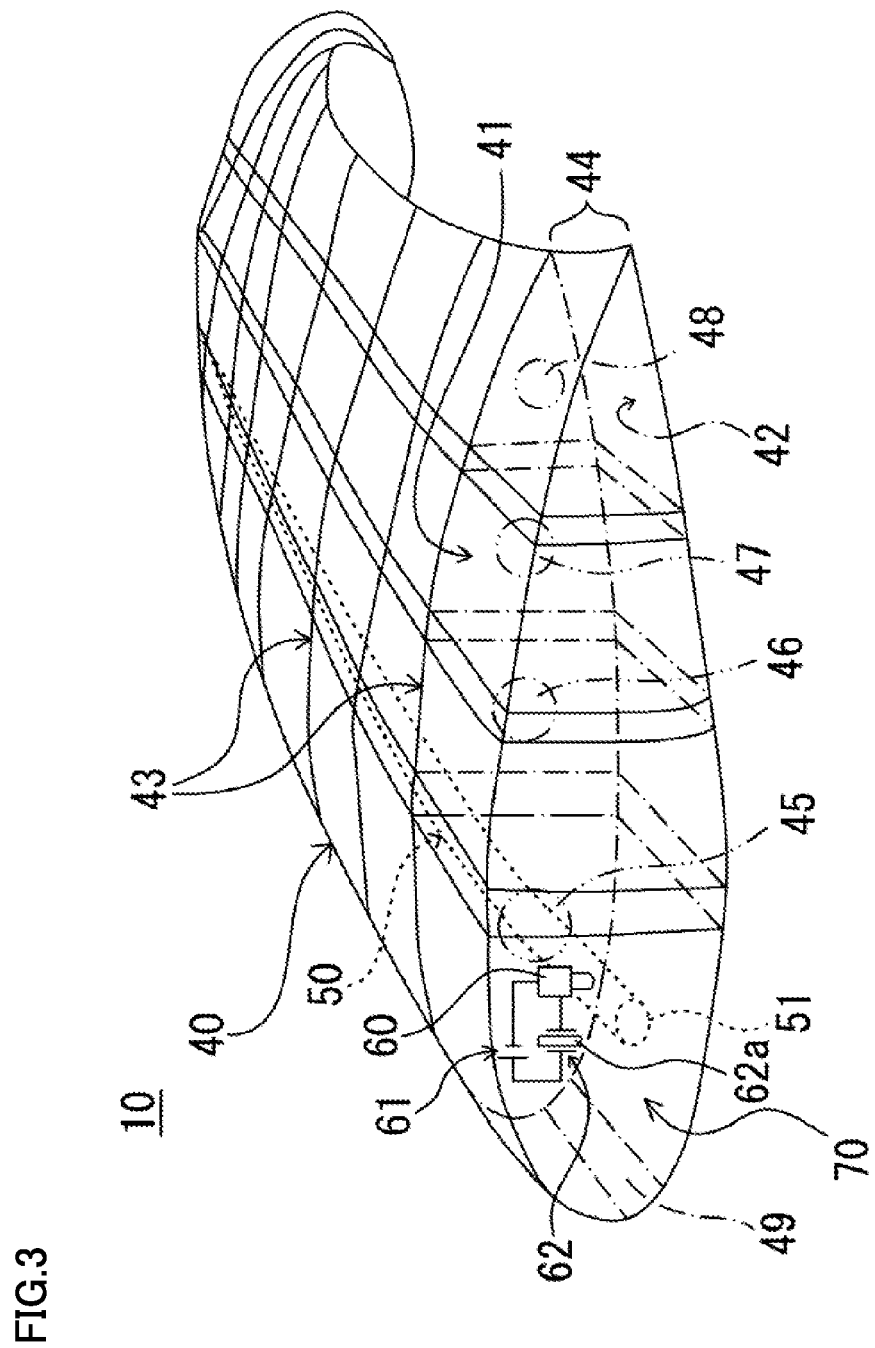
FIG. 3 is a schematic diagram showing a state after a paraglider shown in FIG. 1 is expanded.

FIG. 3 illustrates expanded paraglider 10. Paraglider 10 includes a canopy (a wing-shaped member) 40 and canopy 40 includes an upper cloth 41, a lower cloth 42, a rib 43, and a side cloth 70. A reinforced cloth made of chemical fibers such as nylon or polyester is used for upper cloth 41, lower cloth 42, rib 43, and side cloth 70.

Figure 4:
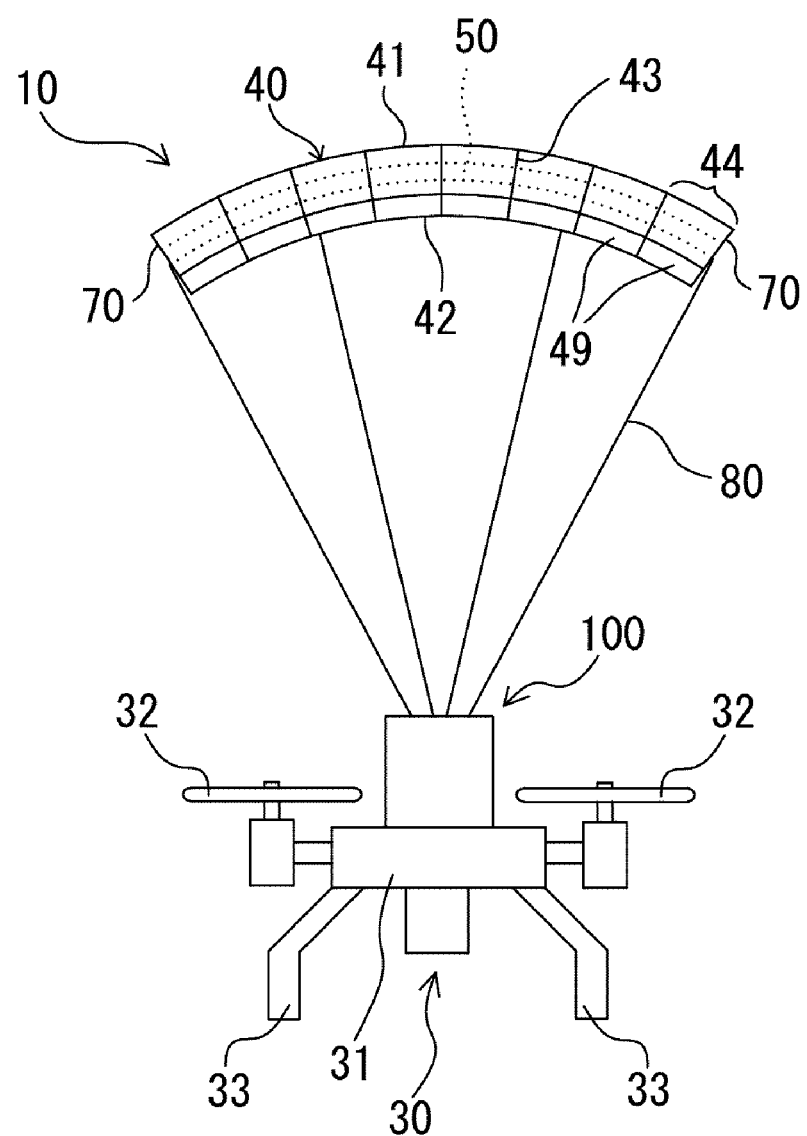
FIG. 4 is a schematic front view showing a state of the aerial vehicle shown in FIG. 2 after the paraglider is expanded.

FIG. 4 illustrates aerial vehicle 30 after paraglider 10 is expanded. Upper cloth 41 and lower cloth 42 have outer edges joined by sewing such that a prescribed space is provided among the upper cloth, the lower cloth, and side cloth 70 on opposing sides thereof. As shown in FIGS. 3 and 4, a plurality of ribs 43 are provided at prescribed intervals between upper cloth 41 and lower cloth 42 so as to define a plurality of cells (air chambers) 44 by vertically partitioning the prescribed space between upper cloth 41 and lower cloth 42. Each of cells 44 is filled with air when canopy 40 is expanded to hold a wing shape thereof.

Ribs 43 are provided with inner air flow holes 45, 46, 47, and 48, and air in cell 44 can laterally move in canopy 40 through inner air flow holes 45, 46, 47, and 48. An air intake (air inlet) 49 is provided in a front portion (front edge) of each cell 44 so that air can be taken into each cell 44. FIG. 3 illustrates only the inside of cell 44 on a front side on the sheet plane as being seen through.

An elongated bag-shaped member 50 which is foldable or can be wound is inserted in inner air flow hole 45. Being foldable here encompasses, for example, being foldable like bellows and being foldable as being layered by being folded back a plurality of times. Bag-shaped member 50 has one end 51 (the front side on the sheet plane in FIG. 3) joined by sewing to side cloth 70 on the front side on the sheet plane in FIG. 3, so that air is less likely to escape. Bag-shaped member 50 is provided as extending along an inner side of upper cloth 41 from a portion of insertion into inner air flow hole 45 toward the other end of canopy 40 (on a rear side on the sheet plane in FIG. 3) (further preferably, joined by sewing to upper cloth 41 or lower cloth 42).

A reinforced cloth similar to that for upper cloth 41 can be employed for bag-shaped member 50, and in particular, a cloth made of a material resistant to heat or a cloth having an inner surface coated with a heat resistant coating is preferably employed in order to protect the cloth against heat of gas generated by a gas generator 60. Since bag-shaped member 50 should withstand sudden inflation resulting from flow-in of gas, it preferably has strength sufficient to withstand a generated gas pressure.

Specifically, for example, nylon 6, nylon 66, nylon 12, nylon 46, nylon 56, nylon 610, copolymerized polyamide of nylon 6 and nylon 66, copolymerized polyamide resulting from copolymerization of polyalkylene glycol, dicarboxylic acid, and amine with nylon 6, a polyester-based resin such as polyethylene terephthalate, polybutylene terephthalate, or polytrimethylene terephthalate, a polyacrylic resin, or a polyolefin-based resin such as polypropylene can be used for a fabric of bag-shaped member 50. Among these, polyamide 66 excellent in resistance against impact and heat can particularly suitably be used for a fabric of bag-shaped member 50.

For example, various resins such as a silicone-based resin, a polyurethane-based resin, a polyacrylic resin, a polyamide-based resin, a polyester-based resin, a polyolefin-based resin, or a fluoric resin and various types of rubber such as silicone-based rubber, chloroprene-based rubber, or chlorosulfonated polyethylene-based rubber can be used for a coating layer provided to the fabric of bag-shaped member 50 for providing heat resistance, and the silicone-based resin is particularly preferably used. By using the silicone-based resin, not only heat resistance but also cold resistance, flame retardancy, and an air cut-off property can be enhanced. A dimethyl silicone resin, a methyl vinyl silicone resin, a methyl phenyl silicone resin, or a fluorosilicone resin is available as such a silicone-based resin. The coating layer preferably further contains a flame-retardant compound. Examples of such a flame retardant compound include a halogen compound containing bromine or chlorine (in particular, halogenated cycloalkane), a platinum compound, antimony oxide, copper oxide, titanium oxide, a phosphorus compound, a thiourea-based compound, carbon, cerium, and silicon oxide, and in particular, a halogen compound, a platinum compound, copper oxide, titanium oxide, or carbon is more preferably used. An appropriate coating layer is preferably selected in accordance with a material for a yarn for making a fabric, and a material securely in intimate contact with warps and wefts is preferred. For example, when yarns are polyamide yarns or polyester yarns, the coating layer is preferably composed of a polyurethane-based resin or a polyacrylic resin.

The other end of bag-shaped member 50 may be provided with a hole (not shown) through which excessive air can be discharged to the outside of canopy 40 for regulating an internal pressure in bag-shaped member 50. A bag-shaped member in a tubular shape (a shape like a pipe or a cylinder) containing an internal space when it is inflated by gas which flows thereinto is preferably used as bag-shaped member 50.

In cell 44 on the front side on the sheet plane in FIG. 3, gas generator 60 capable of emitting gas into bag-shaped member 50 and increasing a pressure in bag-shaped member 50 is provided between one end of bag-shaped member 50 and the portion of insertion of bag-shaped member 50 into inner air flow hole 45.

Gas generator 60 contains an igniter and it is of an explosive type further including an enhancer agent, a gas generating agent, and a filter as necessary. An electric circuit in which a power supply 61 and a switch 62 are connected in series is connected to gas generator 60. This electric circuit is provided inside cell 44 on the front side on the sheet plane in FIG. 3.

A non-azide-based gas generating agent is preferably employed as the gas generating agent, and the gas generating agent is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. As the additive, a binder, a slag formation agent, a combustion modifier, or the like is exemplified. As the binder, for example, metal salt of carboxymethyl cellulose and an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of. Single-base powder, double-base powder, or triple-base powder mainly composed of nitrocellulose may be employed.

A shape of a molding of the gas generating agent includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. A size of a molding or an amount thereof for filling is preferably selected as appropriate, in consideration of a linear burning velocity, a pressure exponent, or the like of the gas generating agent in addition to a shape of the gas generating agent.

Switch 62 includes a positive electrode plate and a negative electrode plate, with an insulator 62a lying between the positive electrode plate and the negative electrode plate. Insulator 62a is coupled to airframe 31, leg 33, aerial vehicle safety apparatus 100, or an injector by a string member (not shown) as a switch controller. Insulator 62a is thus constructed to be pulled out from between the positive electrode plate and the negative electrode plate of switch 62 when paraglider 10 is ejected and tension is produced in the string member.

Therefore, as insulator 62a is pulled out, the positive electrode plate and the negative electrode plate described above are in contact with each other, switch 62 is turned on, and a current flows from the power supply to the electric circuit, so that the igniter is ignited and gas generator 60 is activated. The string member described above is variable in length, so that timing of conduction of a current to the igniter can be adjusted as appropriate.

In one modification, gas generator 60 may communicatively be connected to an external controller. In that case, instead of the string member, an on and off switch for the power supply is controlled by an electrical signal transmitted from the controller. Alternatively, the power supply may be turned on after lapse of an arbitrary time period by using an integrated circuit (IC) timer.

Timing of activation of gas generator 60 may be adjusted by providing a delay charge (an agent that delays ignition of an ignited agent for a prescribed time period) between an ignited agent (combustion agent) in the igniter in gas generator 60 and an ignited portion or by electrically causing delayed ignition (intended delayed ignition). Specific examples of the ignited portion include a component including a resistor that converts transmitted electric energy into thermal energy (for example, a bridge wire made of a Nichrome wire) and a current conduction terminal for conducting electricity to the resistor, although it is not shown.

In another modification of gas generator 60, a hybrid type or stored type gas generator in which a sealing plate in a small gas canister is cleaved by an explosive igniter to emit gas in the inside to the outside may be employed. In this case, incombustible gas such as argon, helium, nitrogen, or carbon dioxide or a mixture thereof can be employed as compressed gas in the gas canister. In order to reliably inflate the bag-shaped member at the time of emission of compressed gas, a heat generator composed of a gas generating composition or a thermite composition may be provided in the gas generator.

By using an ignition delay mechanism (control mechanism) according to each construction described above, timing of expansion of paraglider 10 can appropriately and accurately be controlled by delaying ignition of the igniter for a prescribed time period.

A mechanism that delays timing of conduction of a current to gas generator 60 from a time point of start of ejection of paraglider 10 by actuator 88 among the ignition delay mechanisms according to the constructions described above falls under an activation delay mechanism. In a mechanism that delays timing of start of burning of the ignited agent by using the delay charge, on the other hand, timing of conduction of a current to gas generator 60 is simultaneous with the time point of start of ejection of paraglider 10 by actuator 88. In any case, however, gas is emitted from gas generator 60 at timing delayed as compared with the time point of start of ejection of paraglider 10 by actuator 88.

Since expansion of paraglider 10 is thus basically started after ejection of paraglider 10 is completed and paraglider 10 is distant to such an extent as not interfering with propulsive mechanism 32 provided in aerial vehicle 30 or other portions, ejection of paraglider 10 is not interfered and paraglider 10 can reliably be expanded.

Canopy 40 of expanded paraglider 10 shown in FIGS. 3 and 4 is foldable by any of three methods below.

The first method is a method of winding up canopy 40 such that a portion of canopy 40 in the rear on the sheet plane in FIG. 3 faces inward while each cell 44 is evacuated. The second method is a method of folding canopy 40 as being collapsed in a longitudinal direction by evacuating each cell 44 such that each cell 44 is collapsed sequentially from the rear side of canopy 40 on the sheet plane in FIG. 3. The third method is a method of folding canopy 40 sequentially by bending canopy 40 as being layered while each cell 44 is evacuated such that each cell 44 is collapsed sequentially from the rear side of canopy 40 on the sheet plane in FIG. 3.

Canopy 40 wound up or folded by any method described above is expanded by activation of gas generator 60 after ejection of paraglider 10 into air (more strictly, emission of gas from gas generator 60 after ejection of paraglider 10 into air).

More specifically, as gas is emitted from gas generator 60 after lapse of a prescribed time period since the time point of start of ejection of paraglider 10 by actuator 88, gas flows into bag-shaped member 50 so that bag-shaped member 50 is inflated and inflation of folded bag-shaped member 50 is started. Inflation of cell 44 in canopy 40 in a portion where gas generator 60 is contained is thus started. Since a negative pressure is developed in the inside of cell 44, outside air is taken through air intake 49 into the cell, and cell 44 on the front side on the sheet plane in FIG. 3 is continuously inflated to a prescribed shape.

In succession, gas generated in gas generator 60 further flows into bag-shaped member 50 and bag-shaped member 50 is further inflated and stretched. Then, adjacent cell 44 is successively inflated by taking in outside air through each air intake 49 sequentially from cell 44 provided with gas generator 60 therein, and cell 44 in the rear on the sheet plane in FIG. 3 is finally expanded.

A shape like canopy 40 shown in FIG. 3 is thus formed in an early stage from the time point of activation of gas generator 60. In consideration of efficiency in expansion, gas generator 60 is disposed more preferably at a position around the center of bag-shaped member 50 arranged along the longitudinal direction of paraglider 10.

When canopy 40 is wound up by the first method described above, bag-shaped member 50 is expanded in accordance with the principles similar to those in blowing of a blowout as a toy by a person, and canopy 40 is accordingly also expanded in a similar manner.

Paraglider 10 expanded as described above is coupled to a main body of aerial vehicle safety apparatus 100 by a plurality of lines 80 coupled to opposing sides of canopy 40 and a lower portion of canopy 40 as shown in FIG. 4. By winding up or unwinding each line 80 by using a motor (not shown) provided separately in aerial vehicle safety apparatus 100, tension to each line 80 can be applied or relaxed, so that a direction of travel of paraglider 10 can also be manipulated by giving an instruction to control the motor (not shown) as appropriate by remote control.

As set forth above, according to the present embodiment, an aerial vehicle safety apparatus simplified in structure and being capable of achieving a shorter time period for expansion of paraglider 10 and expanding paraglider 10 with an extremely smaller amount of gas than in a conventional example and an aerial vehicle including the same can be provided.

Since gas generator 60 is of the explosive type containing the igniter in the present embodiment, gas can instantaneously be generated and a speed of expansion of paraglider 10 can be increased.

Though an example in which bag-shaped member 50 is in a shape of a single elongated tube is illustrated in the present embodiment, limitation thereto is not intended. For example, the bag-shaped member may include a plurality of tubular portions formed radially or in grids such that communication through the inside is established. By running the plurality of tubular portions throughout the inside of the canopy, the plurality of tubular portions can be inflated by gas generated in the gas generator so that the paraglider in a wound or folded state can more readily be expanded.

Though an example in which bag-shaped member 50 is inflated by a single gas generator is illustrated in the present embodiment, bag-shaped member 50 may be inflated by a plurality of gas generators. In particular, when the plurality of tubular portions are provided in the bag-shaped member as described above, a volume of the bag-shaped member is accordingly also increased. Therefore, by inflating the bag-shaped member by using a plurality of gas generators, a speed of expansion of the paraglider can be increased.

Though an example in which an explosive type gas generator is mainly employed as the gas generator is illustrated in the embodiments described above, a gas generator of another type such as a canister type may be employed. A micro gas generator (MGG) or a squib structured such that a gas discharge opening is provided by increase in internal pressure by gas generated at the time of activation may be employed instead of the gas generator described above as the gas generator of another explosive type different from the explosive type gas generator described above.

Figure 5:
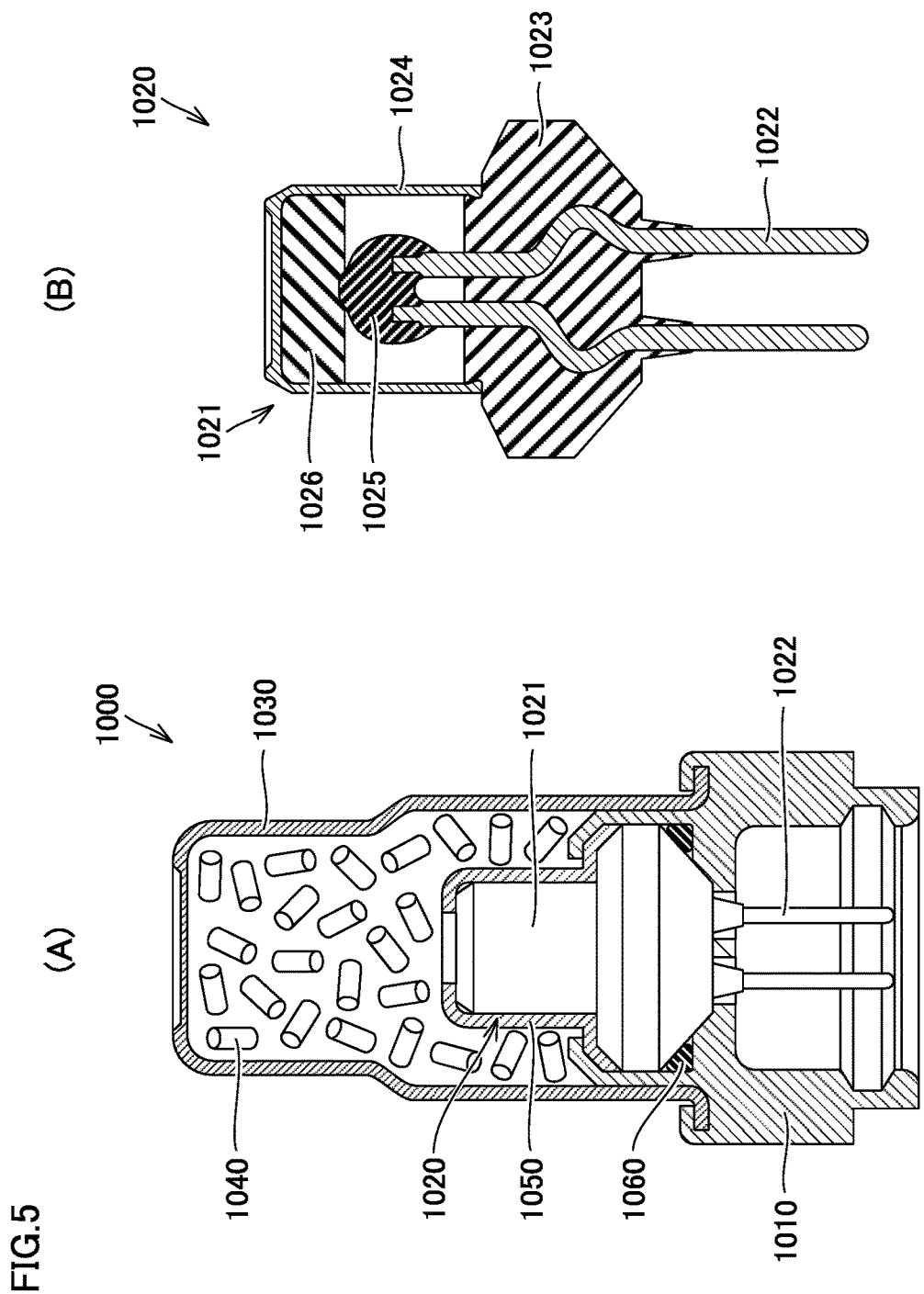
FIG. 5 is a diagram showing an exemplary specific construction of a gas generator shown in FIG. 1.

FIGS. 5 (A) and (B) is a diagram showing an exemplary specific construction of gas generator 60. FIG. 5 (A) shows an exemplary construction of a micro gas generator when the micro gas generator described above is employed as gas generator 60 and FIG. 5 (B) shows an exemplary construction of a squib when the squib described above is employed as gas generator 60.

As shown in FIG. 5 (A), a micro gas generator 1000 includes a holder 1010, a squib 1020, a cup body 1030, a gas generating agent 1040, a combustion control cover 1050, and a sealing member 1060. Squib 1020 and cup body 1030 are held by holder 1010 and a space surrounded by holder 1010, squib 1020, and cup body 1030 is filled with gas generating agent 1040. For example, a squib shown in FIG. 5 (B) which will be described later is employed as squib 1020.

A pair of terminal pins 1022 of squib 1020 is arranged to pass through holder 1010 and a squib main body 1021 connected to the pair of terminal pins 1022 is arranged to face a space in cup body 1030. Squib main body 1021 is covered with combustion control cover 1050 for providing directivity to thermal particles produced in squib main body 1021 at the time of activation of squib 1020. Sealing member 1060 made up, for example, of an O ring for sealing off the space filled with gas generating agent 1040 from the outside is interposed between squib main body 1021 and holder 1010.

By employing micro gas generator 1000 constructed as such, thermal particles are produced in squib main body 1021 upon activation of squib 1020 and the produced thermal particles ignite and burn gas generating agent 1040. A gas pressure generated by burning of gas generating agent 1040 breaks cup body 1030 and generated gas is accordingly emitted to the outside. Emitted gas inflates bag-shaped member 50.

As shown in FIG. 5 (B), squib 1020 includes squib main body 1021 and the pair of terminal pins 1022. Squib main body 1021 mainly includes a base 1023, a cup-shaped member 1024, a fuse head 1025 containing an ignited agent, and a gas generating agent 1026. Cup-shaped member 1024 is held by base 1023 and fuse head 1025 and gas generating agent 1026 are accommodated in a space surrounded by base 1023 and cup-shaped member 1024.

The pair of terminal pins 1022 is arranged to pass through base 1023 and held by base 1023. A tip end of each of the pair of terminal pins 1022 is arranged to face a space in cup-shaped member 1024. The tip ends of the pair of terminal pins 1022 arranged to face the space in cup-shaped member 1024 are connected to each other through a not-shown bridge wire (resistor).

Fuse head 1025 covers the tip ends of the pair of terminal pins 1022 and the bridge wire connecting them to each other, and gas generating agent 1026 is provided as being layered in a space on a bottom side of cup-shaped member 1024 as partially being in contact with fuse head 1025.

By employing squib 1020 constructed as such, as a current conducts to the bridge wire through the pair of terminal pins 1022, heat is generated in the bridge wire, fuse head 1025 is ignited by heat, and gas generating agent 1026 is further ignited by ignited fuse head 1025. A gas pressure generated by burning of gas generating agent 1026 breaks cup-shaped member 1024, generated gas is accordingly emitted to the outside, and emitted gas inflates bag-shaped member 50.

First Modification

An aerial vehicle safety apparatus including a parachute as an expandable object and an aerial vehicle including the same will now be described as a first modification.

Figure 6:
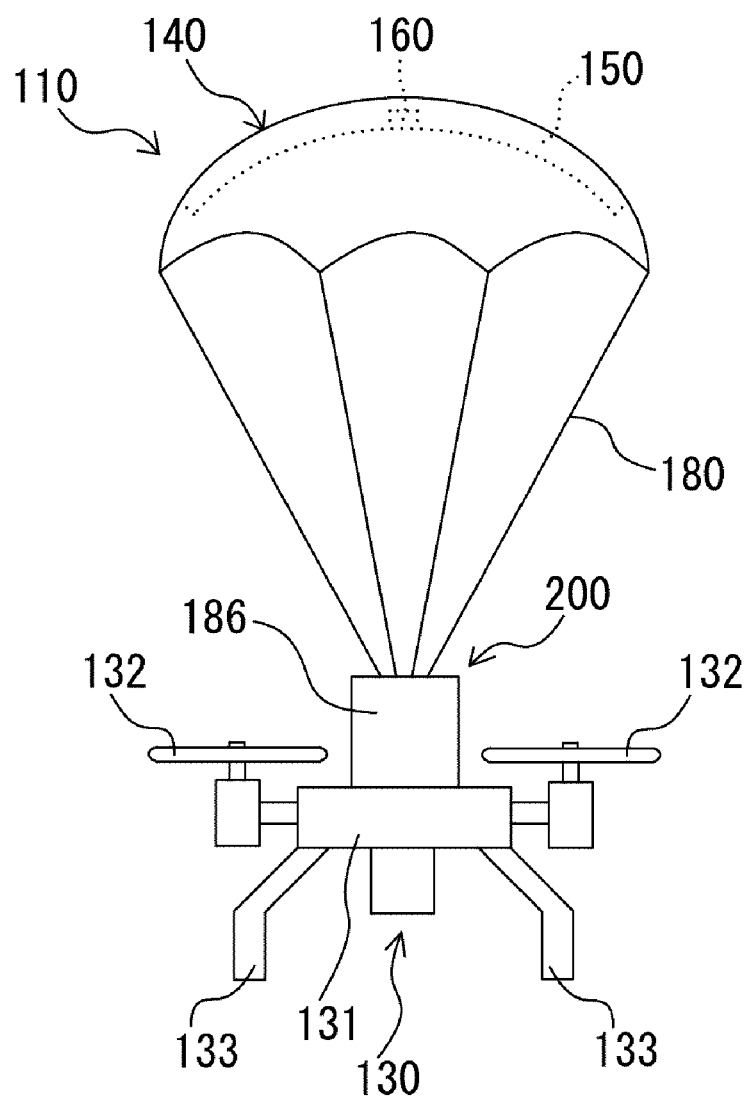
FIG. 6 is a schematic front view showing a state of an aerial vehicle including an aerial vehicle safety apparatus according to a first modification after a parachute is expanded.
Figure 7:
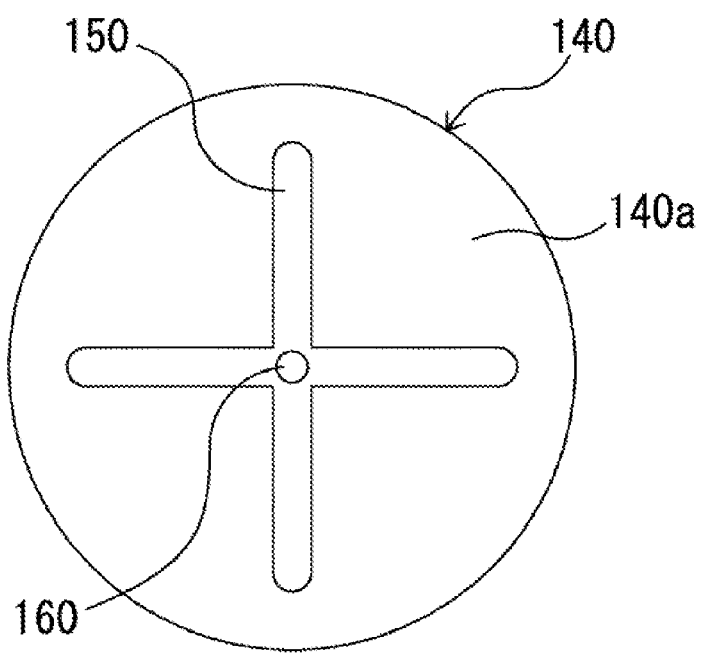
FIG. 7 is a schematic diagram showing an inner construction after the parachute shown in FIG. 6 is expanded.

FIG. 6 is a schematic front view of a state of an aerial vehicle 130 including an aerial vehicle safety apparatus 200 according to the first modification after a parachute 110 is expanded and FIG. 7 is a schematic diagram showing an inner construction after parachute 110 shown in FIG. 6 is expanded. Since features in FIGS. 6 and 7 identical in reference numerals in last two digits to the features shown in FIG. 4 are basically the same as those described with reference to FIG. 4, description thereof may not be provided.

As shown in FIG. 6, though aerial vehicle safety apparatus 200 according to the present modification is substantially similar in construction to aerial vehicle safety apparatus 100 according to the first embodiment, it includes parachute 110 instead of paraglider 10.

As shown in FIGS. 6 and 7, parachute 110 includes a chute 140 foldable to be stored in a housing 186, a bag-shaped member 150 provided on an inner surface 140a of chute 140, and a gas generator 160 capable of supplying gas into bag-shaped member 150. Bag-shaped member 150 and gas generator 160 may be provided on an outer surface of chute 140.

Chute 140 can be made of a material the same as that for the canopy in the first embodiment, and it is one of components that constitute a parachute that can suppress a speed of falling of an object (aerial vehicle 130 here) to which the chute is attached. Chute 140 is connected to housing 186 by a line 180.

Bag-shaped member 150 is inflatably bonded or sewn to inner surface 140a of chute 140 as being foldable before being expanded, similarly to chute 140. Bag-shaped member 150 is constructed to be tubular (like a pipe or a cylinder) in a cross shape as shown in FIG. 7 when it is inflated by flow-in of gas from gas generator 160. Parachute 110 is constructed to be expanded with inflation of folded bag-shaped member 150.

Though an example in which inflated bag-shaped member 150 is in a cross shape is illustrated in the present modification, limitation thereto is not intended. The shape of the inflated bag-shaped member may be, for example, such that a plurality of tubular portions further extend from the center radially or in grids.

Gas generator 160 is similar to gas generator 60 in the first embodiment described above and provided around the center of bag-shaped member 150. Though not shown, also in the present modification, gas generator 160 is connected to an electric circuit similar to that in the first embodiment described above.

According to the present modification constructed as such, a function and effect the same as in the first embodiment can be obtained.

Second Embodiment

An aerial vehicle safety apparatus including an air bag as an expandable object and an aerial vehicle including the same will now be described as a second embodiment.

Figure 8:
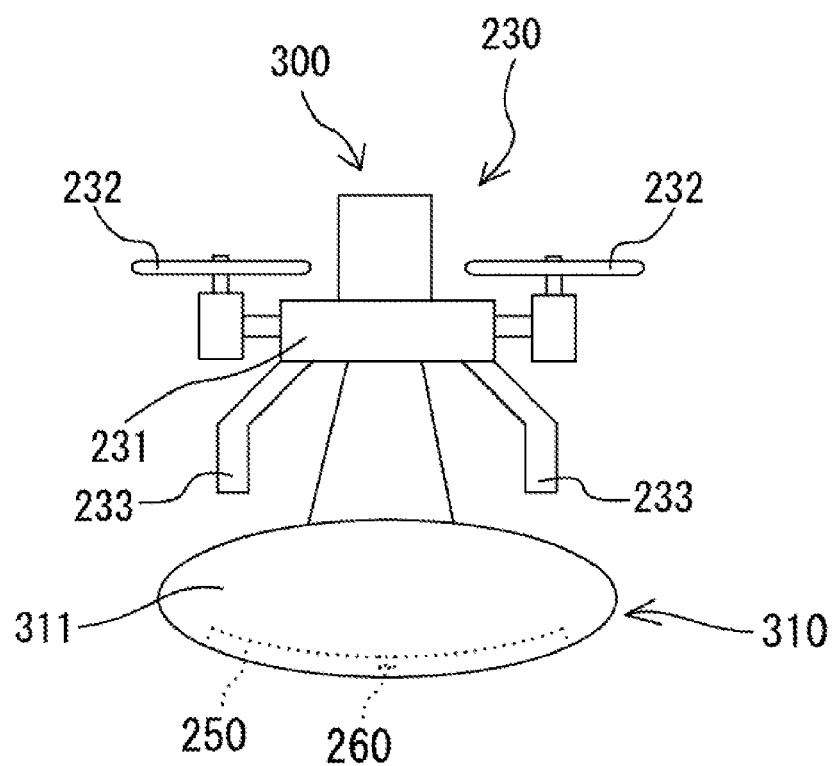
FIG. 8 is a schematic front view showing a state of an aerial vehicle including an aerial vehicle safety apparatus according to a second embodiment after an air bag is expanded.

FIG. 8 is a schematic front view showing a state of an aerial vehicle 230 including an aerial vehicle safety apparatus 300 according to the second embodiment after an air bag 311 is expanded. Since features in FIG. 8 identical in reference numerals in last two digits to the features shown in FIG. 4 are basically the same as those described with reference to FIG. 4, description thereof may not be provided.

As shown in FIG. 8, aerial vehicle 230 includes an air bag apparatus 310 that inflates air bag 311 by a gas pressure generated based on an operation of a gas generator (not shown). Air bag apparatus 310 is provided under an airframe 231 in a normal position as being opposed to a main body of aerial vehicle safety apparatus 300 provided on airframe 231 in the normal position, with airframe 231 being interposed.

On an inner side in a lower portion of air bag 311, a bag-shaped member 250 similar to bag-shaped member 150 in the first modification and a gas generator 260 capable of supplying gas into bag-shaped member 250 are provided. In the present embodiment, bag-shaped member 250 is similar in its expanded shape to bag-shaped member 150 in the first modification, and the shape can also be varied as appropriate to a radial fashion or grids. Bag-shaped member 250 and gas generator 260 may be provided on the outer side of air bag 311. Air bag 311 and bag-shaped member 250 are similar in material to paraglider 10 and bag-shaped member 50 in the first embodiment.

Gas generator 260 is similar to gas generator 60 in the first embodiment described above and provided around the center of bag-shaped member 250. Though not shown, also in the present embodiment, gas generator 260 is connected to an electric circuit similar to that in the first embodiment described above.

Aerial vehicle safety apparatus 300 according to the present embodiment thus constructed can achieve a function and effect below.

In aerial vehicle safety apparatus 300 according to the present embodiment, bag-shaped member 250 can be inflated by operating gas generator 260 after an operation of ordinary air bag apparatus 310 is initiated. Therefore, a portion in air bag 311 where bag-shaped member 250 is provided can be expanded more quickly than other portions. Thus, expanding force of air bag 311 resulting from inflation of bag-shaped member 250 can be added to original expanding force of air bag 311 in air bag apparatus 310. Therefore, a structure can be simplified, a time period for expanding air bag 311 can be reduced, and air bag 311 can be expanded with an extremely smaller amount of gas than in a conventional example.

Since expansion of air bag 311 is basically started after ejection of air bag 311 is completed and air bag 311 is distant to such an extent as not interfering with a leg 233 provided in aerial vehicle 230 or other portions, ejection of air bag 311 is not interfered and air bag 311 can reliably be expanded.

Second Modification

Figure 9:
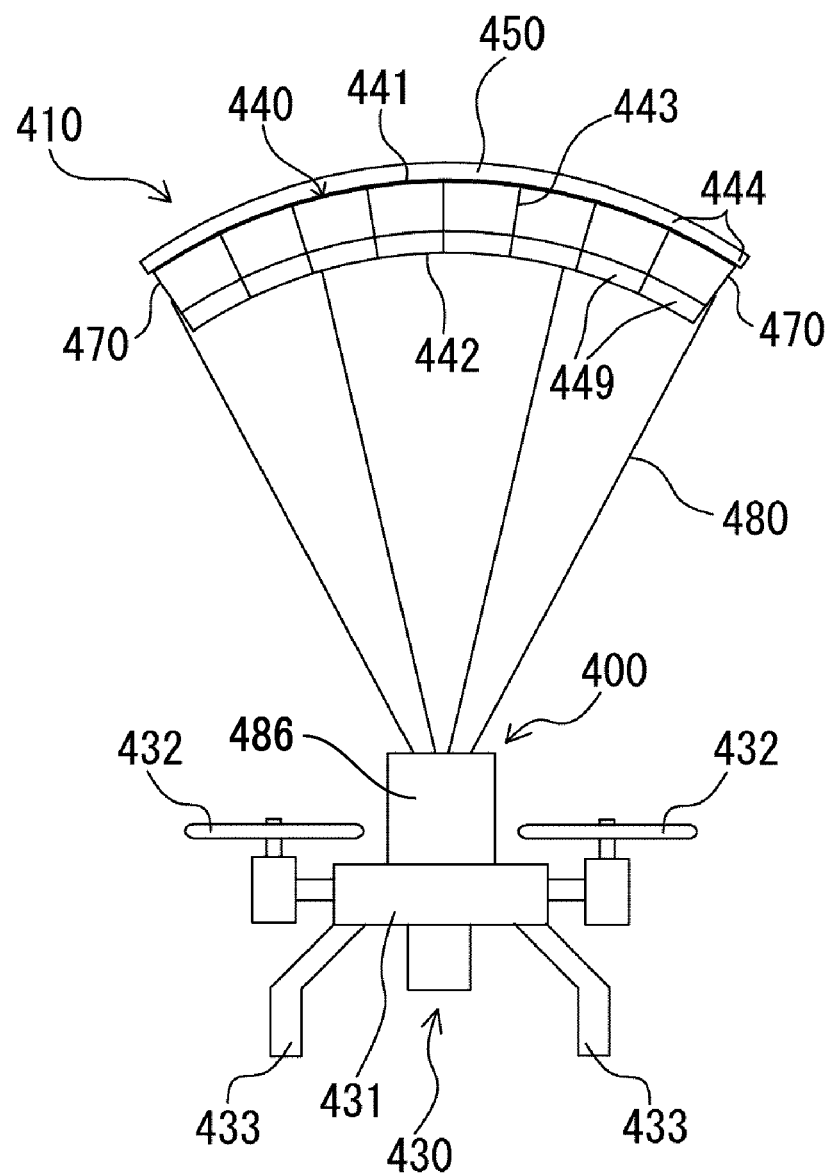
FIG. 9 is a schematic front view of an aerial vehicle including an aerial vehicle safety apparatus according to a second modification after a paraglider is expanded.
Figure 10:
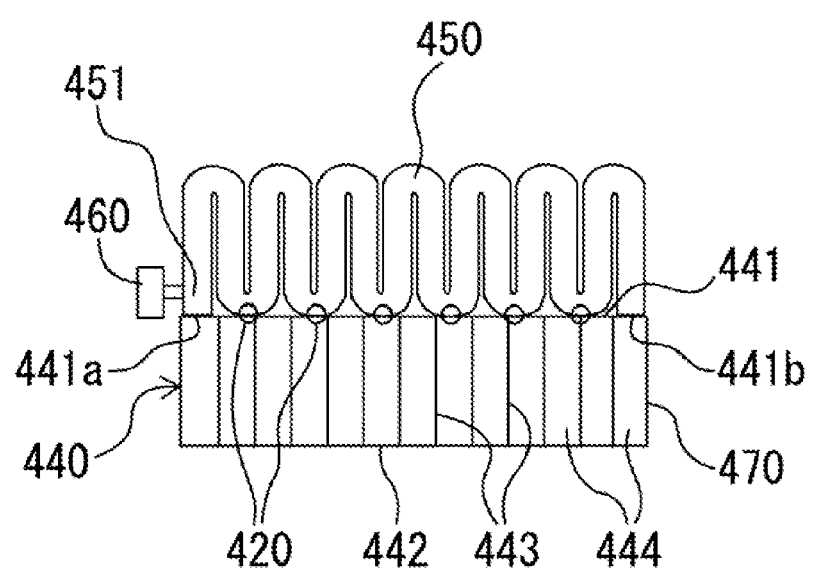
FIG. 10 is a schematic diagram showing an exemplary state of storage of the paraglider shown in FIG. 9.

An example in which an inflatable bag-shaped member is provided outside a paraglider will now be described as a second modification. FIG. 9 is a schematic front view showing a state of an aerial vehicle 430 including an aerial vehicle safety apparatus 400 according to the second modification after a paraglider 410 is expanded and FIG. 10 is a schematic diagram showing an exemplary state of storage of paraglider 410 shown in FIG. 9. Since features in FIGS. 9 and 10 identical in reference numerals in last two digits to the features shown in FIG. 4 are basically the same as those described with reference to FIG. 4, description may not be provided.

As shown in FIGS. 9 and 10, aerial vehicle safety apparatus 400 according to the present modification includes paraglider 410, an inflatable elongated bag-shaped member 450, a gas generator 460 capable of supplying gas into bag-shaped member 450, and an actuator (not shown) similar to actuator 88 in the first embodiment. Aerial vehicle safety apparatus 400 is mounted on aerial vehicle 430.

Paraglider 410 includes a canopy 440 representing a wing-shaped member and it is stored as being folded in a housing 486 of aerial vehicle 430. Canopy 440 of paraglider 410 includes an upper cloth 441, a lower cloth 442, a rib 443, and a side cloth 470, and can be folded by at least any of three methods as in the first embodiment. FIG. 10 shows a folded state with each cell 444 being evacuated.

Bag-shaped member 450 is in a shape like a tube (a pipe or a cylinder) containing an internal space when it is inflated by gas that flows thereinto, and provided on canopy 440. More specifically, as shown in FIG. 10, opposing ends of bag-shaped member 450 are coupled (or bonded) to left and right ends 441a and 441b of upper cloth 441 of canopy 440 by sewing or by a string.

When bag-shaped member 450 is bonded to canopy 440, such a bonding pattern that bag-shaped member 450 and canopy 440 are bonded to each other only at two locations of left and eight ends 441a and 441b of upper cloth 441 as shown in FIG. 10 may be applicable. Limitation thereto, however, is not intended, and a bonding pattern may be, for example, such that the bag-shaped member and the canopy are bonded to each other by providing a plurality of bonded portions 420 (see an encircled portion in FIG. 10) at prescribed intervals in a longitudinal direction of upper cloth 441 in addition to left and right ends 441a and 441b of upper cloth 441. Bonded portions 420 may be provided on a plurality of ribs 443 of canopy 440.

Bag-shaped member 450 can be stored in housing 486 of aerial vehicle 430 as being folded or wound, and bag-shaped member 450 has one end 451 connected to gas generator 460. FIG. 10 shows bag-shaped member 450 folded like bellows.

Gas generator 460 is similar to gas generator 60 in the first embodiment described above and provided at one end 451 of bag-shaped member 450. Though not shown, also in the present modification, gas generator 460 is connected to an electric circuit similar to that in the first embodiment described above.

According to the present modification constructed as such, as shown in FIG. 10, paraglider 410 and bag-shaped member 450 are stored in housing 486 as being folded. As gas generator 460 is activated after ejection into air by activation of the actuator in housing 486, folded bag-shaped member 450 is inflated and canopy 440 of paraglider 410 is forcibly and instantaneously expanded.

Since a negative pressure is developed in each cell 444, each cell 444 is inflated by taking in outside air through a plurality of air intakes 449 and paraglider 410 is expanded as shown in FIG. 9. Since bag-shaped member 450 is thus maintained in a tubular state with the bag-shaped member being filled with gas, the shape like a wing is held by a function of bag-shaped member 450 like a skeleton of canopy 440 and aerial vehicle 430 can fly in a stable manner.

Therefore, according to the present modification, aerial vehicle safety apparatus 400 simplified in structure that is capable of achieving a shorter time period for expanding paraglider 410 and expanding paraglider 410 with an extremely smaller amount of gas than in a conventional example can be provided. Since bag-shaped member 450 holds the wing-like shape of paraglider 410 in the present modification, flight stability can be higher than in a conventional example.

Though an example in which bag-shaped member 50 is in a shape of a single elongated tube is illustrated in the present modification, limitation thereto is not intended and a shape of bag-shaped member 450 may be changed as appropriate. For example, the bag-shaped member may include a plurality of tubular portions formed radially or in grids such that communication through the inside is established. Bag-shaped member 450 may be provided outside lower cloth 442 of canopy 440.

In order to enhance stability of the shape at the time of expansion of paraglider 410, expanded bag-shaped member 450 may be higher in tension (strength) than canopy 440. In consideration of efficiency in expansion of paraglider 410, a position where gas generator 460 is to be disposed may be set to a position around the center of bag-shaped member 450.

Third Modification

An example in which a skeleton member as a shape restorable member instead of the bag-shaped member is provided in an expandable object (a paraglider, a parachute, or an air bag) equipped in an aerial vehicle safety apparatus will now be described as a third modification.

Figure 11:
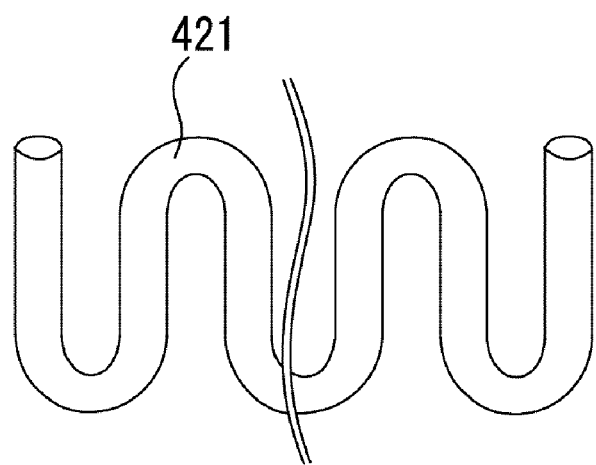
FIG. 11 is a diagram showing a skeleton member as a shape restorable member provided in an aerial vehicle safety apparatus according to a third modification, with (A) being a schematic diagram showing a state of storage of the skeleton member and (B) being a schematic diagram showing an extended state of the skeleton member.
Figure 11:
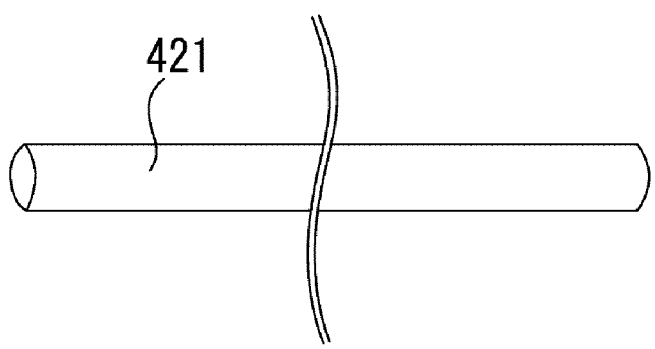

FIG. 11 is a diagram showing a skeleton member 421 as a shape restorable member provided in the aerial vehicle safety apparatus according to the third modification, with (A) being a schematic diagram showing a state of storage of skeleton member 421 and with (B) being a schematic diagram showing an extended state of skeleton member 421. As shown in FIGS. 11 (A) and (B), skeleton member 421 is formed from an elastically deformable elongated member like a rod (that is, an elastic member) and made, for example, from a rod material made of rubber or a metal.

When skeleton member 421 is made from a rod material made of rubber, skeleton member 421 is bent as shown in FIG. 11 (A) and stored in the housing of the aerial vehicle safety apparatus in a locked state as being fastened by a string member (not shown) including a locking instrument such as a hook. At least a part of skeleton member 421 is bonded to the outside of the expandable object.

A gas generator for unlocking is provided outside the expandable object. The gas generator is connected to skeleton member 421 and gas and heat generated at the time of activation can cancel a state of locking of skeleton member 421 by the string member.

In the present modification constructed as such, the gas generator for unlocking is activated after ejection of the expandable object into air to cancel the state of locking of skeleton member 421 by the string member so that elastic resilience is produced in skeleton member 421. Therefore, skeleton member 421 is instantaneously in the extended state shown in FIG. 11 (B). With extension of skeleton member 421, the expandable object can forcibly and instantaneously be expanded.

Since skeleton member 421 can hold an expanded shape of the expandable object, deformation of the expandable object by strong wind can be suppressed and flight stability is higher than in a conventional example.

The state of storage and the extended state of skeleton member 421 are not limited to a specific shape, and any shape is applicable so long as the expanded shape of the expandable object can be held.

Though an example in which the string member including a locking instrument such as a hook is employed as a locking member is illustrated in the present modification, any locking member is applicable so long as it can maintain a bent state of skeleton member 421. For example, the skeleton member may be locked as being bent by an annular band as a locking member and stored in the housing, and as the gas generator for unlocking is activated, the band may be detached (generated heat melts and cuts the band or generated gas blows away and removes the band) to cancel the state of locking of the skeleton member. In addition, the housing of the aerial vehicle safety apparatus may be used as a member that locks the skeleton member and the skeleton member may be stored together with the expandable object therein with the skeleton member being bent as shown in FIG. 11 (A), and as the expandable object is ejected to the outside of the housing, the state of locking of the skeleton member by the housing may be canceled.

Though an example in which the skeleton member includes an elastic member is described in the present modification, limitation thereto is not intended. For example, the skeleton member can also be made from a rod material made of a shape memory alloy as a shape memory member with shape memory characteristics. Shape memory refers to a property to restore an original shape (an initial shape) before deformation by heating of a deformed metal to a temperature equal to or higher than a certain temperature.

In this case, the skeleton member made from a rod material made of a shape memory alloy is at least partially bonded to the outside of the expandable object and stored as being bent in the housing including an actuator as an ejection apparatus. The skeleton member returns to the original shape of the rod material by being heated by activation of the gas generator provided in the actuator and ejected from the housing, and accordingly, the expandable object is forcibly and instantaneously expanded. Since the skeleton member holds the expanded shape of the expandable object also in this case, flight stability can be higher than in a conventional example.

(Lowering in Speed in the Event of Falling of Aerial Vehicle by Using Aerial Vehicle Safety Apparatus)

From a point of view of securing safety in the event of falling of an unmanned aircraft, various laws and regulations have recently been developed in each country. One of such laws and regulations is restriction of an impact value at the time of collision of an unmanned aircraft with some kind of an object in the event of falling to a prescribed value or smaller. The upper limit of the allowable impact value may be restricted, for example, to be smaller than 69 [J] although the value is different from country to country.

In order to lower a speed of an aerial vehicle so as to achieve the impact value smaller than 69 [J], the aerial vehicle should be decelerated to satisfy relation of 69 $[J] > (1/2) \times m \times V^2$ where m [kg] represents a total weight of an aerial vehicle including an aerial vehicle safety apparatus and v [m/s] represents a speed of the aerial vehicle when it falls. Therefore, when a total weight m is not lighter than 1 [kg] and not heavier than 1000 [kg], the aerial vehicle should be decelerated in an early stage such that the speed of the aerial vehicle is from 0.3 [m/s] to at most 11.7 [m/s] in accordance with the total weight.

Therefore, the aerial vehicle safety apparatus and the aerial vehicle including the same according to the first and second embodiments and the first to third modifications described above should importantly be designed to achieve lowering in speed by expanding an expandable object such as a parachute or a paraglider in the early stage.

As described above, from a point of view of deceleration of the aerial vehicle without delay, a time period from a time point of ejection by the ejection apparatus until start of expansion of the expandable object is preferably shorter and the time period is preferably within ten seconds, more preferably within eight seconds, further preferably within five seconds, or within three seconds or one second in some cases. Since the time period from start of ejection of the expandable object until completion of expansion is different depending on a length of a coupling member (that is, a line or a cord) connecting the expandable object and the aerial vehicle to each other or a total weight of the aerial vehicle, timing of start of expansion of the expandable object should accordingly be adjusted as appropriate.

An example in which an expandable object such as a parachute or a paraglider is expanded at once from the non-expanded state where the expandable object is wound or folded is illustrated and described in connection with the aerial vehicle safety apparatus and the aerial vehicle including the same according to the first and second embodiments and the first to third modifications described above. When the construction is as such, however, excessively large impact applied to the aerial vehicle in expansion of the expandable object is also a concern.

Therefore, impact applied to the aerial vehicle can also be mitigated by constructing the expandable object so as to be expanded in multiple stages by providing a plurality of objects to be expanded and varying timing of expansion thereof or by dividing a single expandable object into areas that can be expanded in one expansion and expanding these areas at different timing. From a point of view of achieving both of mitigation of impact applied to the aerial vehicle and simplification of an apparatus construction, the expandable object is preferably constructed so as to be expanded in two or three stages.

Summary of First and Second Embodiments and First to Third Modifications

Characteristic features in the disclosure in the first and second embodiments and the first to third modifications described above are summarized as below by paragraphs.

(1) An apparatus for expanding a parachute or a paraglider according to the present invention includes a parachute or a paraglider, an apparatus for ejecting the parachute or the paraglider, a bag-shaped member that is provided in the parachute or the paraglider, wound or folded, inflatable like a tube from the wound or folded state, and capable of expanding the parachute or the paraglider in the wound or folded state when the bag-shaped member is inflated like the tube, and a gas generator capable of causing gas generated at the time of activation to flow in the bag-shaped member to inflate the bag-shaped member.

(2) From another point of view, an apparatus for expanding a parachute or a paraglider according to the present invention may include a parachute or a paraglider, an apparatus for ejecting the parachute or the paraglider, a bag-shaped member that is coupled to the parachute or the paraglider, wound or folded separately from the parachute or the paraglider, inflatable like a tube from the wound or folded state, and capable of expanding the parachute or the paraglider in the wound or folded state when the bag-shaped member is inflated like the tube, and a gas generator capable of causing gas generated at the time of activation to flow in the bag-shaped member to inflate the bag-shaped member.

According to the construction in (1) or (2), an apparatus for expanding a parachute or a paraglider simplified in structure, capable of achieving a shorter time period for expansion of the parachute or the paraglider, and capable of expanding the parachute or the paraglider with an extremely smaller amount of gas than in a conventional example can be provided. The gas generator referred to here is categorized into a gas generator of an explosive type and a gas generator of a non-explosive type, and the gas generator of the explosive type includes an igniter. Examples of the gas generator of the non-explosive type include a gas generator that generates gas by mixing or a gas generator in which gas is sealed in a canister. Since a shape of an expanded parachute or paraglider can be held by using the expanded bag-shaped member as a skeleton (beam), the expansion apparatus can be higher in flight stability than a conventional expansion apparatus.

Many parachutes have a fabric in a shape of an umbrella, and the parachute is connected to an object to be protected through a cord and decelerates the object to be protected by using air resistance. Examples of the parachute include a parachute including a single chute, a parachute including a string of chutes identical in shape, and a parachute including a string of chutes different in shape. Examples of the parachute further include a parachute including a chute having a closed center and a parachute including a chute provided with a hole called a spill hole in the center. A parachute is selected as appropriate for mitigation of shock at the time of expansion of the parachute, a rate of descent, and resistance against influence by disturbance such as wind.

A paraglider is in a shape like a wing having an aspect ratio approximately not lower than one, and it has a steering cord called a brake cord connected to left and right ends of the wing. By pulling the brake cord, various stresses applied to a cross-section of the wing can be varied, and consequently, gliding, turning, and rapid deceleration can be done. Therefore, the paraglider can do gliding, turning, and deceleration which cannot be done by a parachute. A Rogallo paraglider is also available as a paraglider similar in feature. In order to maintain the wing shape by using ram air, a paraglider with an air intake is in the mainstream, however, there is a paraglider without an air intake. In order to fly in a stable manner, a paraglider with an air intake is more preferable. A paraglider capable of flying by forcibly obtaining propelling force by including a propulsive apparatus such as a propeller may be applicable.

(3) From another point of view, an apparatus for expanding a parachute or a paraglider according to the present invention may include a parachute or a paraglider, an apparatus for ejecting the parachute or the paraglider, and a shape restorable member that is provided in the parachute or the paraglider, wound or folded together with the parachute or the paraglider, capable of restoring an initial shape by elastic force or shape resilience owing to shape memory from a wound or folded state after ejection of the parachute or the paraglider by the ejection apparatus, and capable of expanding the wound or folded parachute or paraglider when the shape restorable member restores the initial shape.

(4) From yet another point of view, an apparatus for expanding a parachute or a paraglider according to the present invention may include a parachute or a paraglider, an apparatus for ejecting the parachute or the paraglider, and a shape restorable member that is coupled to the parachute or the paraglider, wound or folded separately from the parachute or the paraglider, capable of restoring an initial shape by elastic force or shape resilience owing to shape memory from a wound or folded state after ejection of the parachute or the paraglider by the ejection apparatus, and capable of expanding the wound or folded parachute or paraglider when the shape restorable member restores the initial shape.

According to the construction in (3) or (4), an effect as in (1) can be achieved.

(5) The apparatus for expanding a parachute or a paraglider in (3) or (4) includes a locking member capable of locking the shape restorable member in the wound or folded state, the locking being canceled by application of external force or energy, and the shape restorable member preferably includes an elastic member.

Since the shape restorable member locked as being wound or folded by the locking member has stored elastic force, it instantaneously returns to the shape restorable member in the initial state as locking by the locking member is canceled. Therefore, according to the construction in (5), the parachute or the paraglider can quickly be expanded by canceling locking by the locking member.

(6) The apparatus for expanding a parachute or a paraglider in (5) preferably includes a gas generator capable of canceling locking by the locking member by making use of thermal energy or a pressure of gas generated at the time of activation.

(7) From another point of view, the apparatus for expanding a parachute or a paraglider in (5) may include a gas generator provided for canceling locking by the locking member.

(8) From yet another point of view, the apparatus for expanding a parachute or a paraglider in (5) may include a gas generator capable of conducting heat generated at the time of activation to the shape restorable member and the shape restoration member may restore an original shape by conduction of heat.

According to the construction in (6) to (8), a shape restorable member can be locked and locking of the shape restorable member by the locking member can readily be canceled by a simplified construction. In particular, according to the construction in (7), locking by the locking member can more accurately be canceled.

(9) In the apparatus for expanding a parachute or a paraglider in (1), (2), (7), or (8), the gas generator preferably includes a control mechanism that controls the gas generator to be activated after activation of the ejection apparatus.

According to the construction in (9), timing of expansion of the parachute or the paraglider can appropriately be controlled.

(10) In the apparatus for expanding a parachute or a paraglider in (9), the gas generator is preferably of an explosive type containing an igniter.

According to the construction in (10), gas can instantaneously be generated. If a gas canister type gas generator without using an explosive is employed, a sharp member such as a needle and a compressed spring are coupled to each other and the sharp member is driven off by using spring force to impinge the sharp member onto a sealing plate that seals the canister and to emit gas. Though a servo motor is normally used for releasing compressive force of the spring, a response speed of the servo motor is remarkably lower than a response speed of the explosive. Therefore, a gas canister type gas generator is significantly lower in speed of generation of gas than an explosive type gas generator. In order to constantly maintain compressive force of the spring, a locking member high in strength is required and cost and also a weight increase. Therefore, use of the gas generator of an explosive type including an igniter can achieve reduction in size and weight of the apparatus for expanding a parachute or a paraglider as compared with a gas canister type gas generator without using an explosive.

In the apparatus for expanding a parachute or a paraglider in (9), the control mechanism preferably includes an ignition delay mechanism that delays ignition of the igniter for a prescribed time period. Delay in ignition here means emission of gas from the gas generator and expansion of the parachute or the paraglider at timing later than timing of ejection of the parachute or the paraglider.

According to the ignition delay mechanism, the parachute or the paraglider can be expanded after ejection of the parachute or the paraglider. When the parachute or the paraglider is ejected and simultaneously expanded, expansion of the parachute or the paraglider starts within the ejection apparatus and may interfere ejection. When the parachute or the paraglider is ejected and simultaneously expanded, the parachute or the paraglider may be entangled with a propulsive apparatus of the aerial vehicle to which the present expansion apparatus is attached or with another component. Therefore, time of delay by the ignition delay mechanism (a time period from ejection of the parachute or the paraglider until expansion thereof) is preferably set as appropriate such that gas is not emitted from the gas generator until ejection of the parachute or the paraglider from the ejection apparatus is completed and the parachute or the paraglider is distant to such an extent as not interfering with the propulsive apparatus provided in the aerial vehicle or another component.

(11) In the apparatus for expanding a parachute or a paraglider in (10), preferably, the igniter contains an ignited agent and ignition means capable of generating flame energy for igniting the ignited agent, and the ignition delay mechanism includes a delay charge that is provided between the ignited agent and the ignition means and transmits flame energy of the ignition means to the ignited agent with a time lag. The delay charge is composed, for example, of a composition serving to hold flame energy converted in the igniter from electric energy input to the igniter and transmit flame energy to the ignited agent with a time lag. Normally, the delay charge is composed of at least one oxidizer selected from the group consisting of oxides and peroxides and at least one reducing agent selected from among simple substances of metal, metal nitrides, metal silicon compounds, metal fluorine compounds, metal sulfides, and metal phosphorus compounds.

(12) In the apparatus for expanding a parachute or a paraglider in (10), the ignition delay mechanism preferably includes an electric circuit including a power supply and a switch of the power supply and a controller that controls the switch.

(13) In the apparatus for expanding a parachute or a paraglider in (10), the ignition delay mechanism may include a power supply, a positive electrode plate, a negative electrode plate opposed to the positive electrode plate, and an insulator removably interposed between the positive electrode plate and the negative electrode plate, and include a switch capable of switching the power supply from off to on and a string member having one end coupled to the insulator and the other end coupled to a main body of the ejection apparatus or to a prescribed portion to which the expansion apparatus is fixed. The expansion apparatus may switch the power supply from off to on when the parachute or the paraglider is ejected, in such a manner that the insulator is pulled by the string member and removed from between the positive electrode plate and the negative electrode plate to allow the positive electrode plate and the negative electrode plate to come in contact with each other.

According to the construction in (11) to (13), timing of expansion of the parachute or the paraglider can appropriately and accurately be controlled. Without such a feature, in order to activate the expansion apparatus at delayed timing, a lead wire necessary for transmitting an activation signal even during ejection should be held on a side of the parachute or the paraglider, which leads to a concern about increase in weight of a component or break of a lead wire. Furthermore, units for controlling the ejection apparatus and the expansion apparatus are required, which leads to complication and increase in weight.

(14) In the apparatus for expanding a parachute or a paraglider in (13), a length of the string member is preferably adjustable in the ignition delay mechanism.

According to the construction in (14), timing of conduction of a current to the igniter in the gas generator can be adjusted as appropriate.

(15) In the apparatus for expanding a parachute or a paraglider in (1) or (2), the bag-shaped member preferably includes a plurality of tubular portions formed radially or in grids so as to establish communication through the inside.

According to the construction in (15), the plurality of tubular portions provided over a wide area of the parachute or the paraglider can be inflated by gas generated by a single gas generator or a plurality of gas generators. Therefore, the wound or folded parachute or paraglider can more readily be expanded. When there are a plurality of gas generators, a structure is complicated and weight or cost increase. Therefore, a single gas generator is more preferably provided.

(16) In the apparatus for expanding a parachute or a paraglider in (1) or (2), the bag-shaped member is preferably provided along a longitudinal direction of the expanded paraglider.

According to the construction in (16), the paraglider in a compactly wound or folded state can more efficiently be expanded.

(17) In the apparatus for expanding a parachute or a paraglider in (1) or (2), preferably, the paraglider includes a wing-shaped member containing a plurality of air chambers and a plurality of air inlets provided in a front portion so as to correspond to respective ones of the air chambers, and in the inside or the outside of the wing-shaped member, the bag-shaped member is provided to extend along the plurality of air inlets of the expanded paraglider, in the vicinity of the plurality of air inlets.

According to the construction in (17), when the bag-shaped member provided in the wing-shaped member is inflated, the wing-shaped member of the wound or folded paraglider can forcibly and instantaneously be expanded and hence a negative pressure is developed in the inside of the wing-shaped member. Since air can thus be forced to flow into the wing-shaped member through the plurality of air inlets, the wing-shaped member of the paraglider can quickly be expanded.

(18) From another point of view, an apparatus for expanding an air bag according to the present invention includes an air bag, a bag-shaped member that is provided inside or outside the air bag, wound or folded together with the air bag, inflatable like a tube from the wound or folded state, and capable of expanding the wound or folded air bag when it is inflated like the tube, and a gas generator capable of inflating the bag-shaped member by causing generated gas to flow into the bag-shaped member at the time of activation.

(19) From another point of view, an apparatus for expanding an air bag according to the present invention includes an air bag, a bag-shaped member that is provided inside or outside the air bag, wound or folded separately from the air bag, inflatable like a tube from the wound or folded state, and capable of expanding the wound or folded air bag when it is inflated like the tube, and a gas generator capable of inflating the bag-shaped member by causing generated gas to flow into the bag-shaped member at the time of activation.

As gas flows into the wound or folded bag-shaped member described above, the bag-shaped member is readily inflated and formed like a tube (like a pipe or a cylinder) including an internal space. Thus, according to the construction in (18) or (19), a structure can be simplified, a time period for expanding the air bag can be shorter, and an extremely smaller amount of gas than in a conventional example can expand the air bag.

(20) From another point of view, an apparatus for expanding an air bag according to the present invention includes an air bag and a shape restorable member that is provided inside or outside the air bag, wound or folded together with the air bag, capable of restoring an initial shape by elastic force or shape resilience owing to shape memory from a wound or folded state, and capable of expanding the wound or folded air bag when the shape restorable member restores the initial shape.

(21) From another point of view, an apparatus for expanding an air bag according to the present invention includes an air bag and a shape restorable member that is provided inside or outside the air bag, wound or folded separately from the air bag, capable of restoring an initial shape by elastic force or shape resilience owing to shape memory from a wound or folded state, and capable of expanding the wound or folded air bag when the shape restorable member restores the initial shape.

According to the construction in (21), an air bag can readily be expanded in spite of a simplified structure.

(22) An aerial vehicle according to the present invention includes an airframe, the apparatus for expanding a parachute or a paraglider in (1) to (17) coupled to the airframe and/or the apparatus for expanding an air bag in (11) coupled to the airframe, and one propulsive mechanism or a plurality of propulsive mechanisms that is/are coupled to the airframe and propel(s) the airframe.

According to the construction in (22), since an aerial vehicle includes the apparatus for expanding a parachute or a paraglider in (1) to (17), as described above, a structure is simplified, a time period for expansion of a parachute or a paraglider can be shorter, and the parachute or the paraglider can be expanded with an extremely smaller amount of gas than in a conventional example. When the apparatus for expanding an air bag in (18) to (21) is provided, as described above, a structure is simplified, a time period for expansion of an air bag can be shorter, and the air bag can be expanded with an extremely smaller amount of gas than in a conventional example.

As set forth above, according to the present invention, an apparatus for expanding a parachute or a paraglider simplified in structure capable of achieving a shorter time period for expanding the parachute or the paraglider and expanding the parachute or the paraglider with an extremely smaller amount of gas than in a conventional example and an aerial vehicle including the same can be provided. According to the present invention, since a shape of an expanded parachute or paraglider can be held by using the expanded bag-shaped member or a shape restorable member as a skeleton (beam), the expansion apparatus can be higher in flight stability than a conventional expansion apparatus.

It should be understood that the embodiments and the modifications thereof disclosed herein are illustrative and non-restrictive in every respect. The technical scope of the present invention is delimited by the terms of the claims and is intended to include any modifications within the scope and meaning equivalent to the terms of the claims.

REFERENCE SIGNS LIST

10 paraglider; 30 aerial vehicle; 31 airframe; 32 propulsive mechanism; 33 leg; 40 canopy; 41 upper cloth; 42 lower cloth; 43 rib; 44 cell; 45 to 48 inner air flow hole; 49 air intake; 50 bag-shaped member; 51 one end; 60 gas generator; 61 power supply; 62 switch; 62*a* insulator; 70 side cloth; 80 line; 81 piston; 82 recess; 83 piston head; 84 igniter; 85 case; 86 housing; 87 lid; 88 actuator; 100 aerial vehicle safety apparatus; 110 parachute; 130 aerial vehicle; 131 airframe; 132 propulsive mechanism; 133 leg; 140 chute; 140*a* inner surface; 150 bag-shaped member; 160 gas generator; 180 line; 186 housing; 200 aerial vehicle safety apparatus; 230 aerial vehicle; 231 airframe; 232 propulsive mechanism; 233 leg; 250 bag-shaped member; 260 gas generator; 300 aerial vehicle safety apparatus; 310 air bag apparatus; 311 air bag; 400 expansion apparatus; 410 paraglider; 420 bonded portion; 421 skeleton member; 430 aerial vehicle; 431 airframe; 432 propulsive mechanism; 433 leg; 440 canopy; 441 upper cloth; 441*a*, 441*b* left and right ends; 442 lower cloth; 443 rib; 444 cell; 449 air intake; 450 bag-shaped member; 451 one end; 460 gas generator; 470 side cloth; 480 line; 486 housing; 1000 micro gas generator; 1010 holder; 1020 squib; 1021 squib main body; 1022 terminal pin; 1023 base; 1024 cup-shaped member; 1025 fuse head; 1026 gas generating agent; 1030 cup body; 1040 gas generating agent; 1050 combustion control cover; 1060 sealing member

The invention claimed is:

1. An aerial vehicle safety apparatus attachable to an aerial vehicle comprising:
    an expandable object that is wound or folded in a non-expanded state, the expandable object being capable of generating at least one of lift and buoyancy in an expanded state;
    an ejection apparatus coupled to the expandable object with a coupling member being interposed, the ejection apparatus being configured to eject the non-expanded expandable object into air;
    a bag-shaped member provided in the expandable object, the bag-shaped member being wound or folded together with or separately from the non-expanded expandable object and being configured to expand the non-expanded expandable object when the bag-like member is at least partially inflated to a tube-like shape;
    a gas generator provided in the expandable object, the gas generator being configured to inflate the bag-shaped member by causing gas generated at time of activation to flow into the bag-shaped member; and
    a control mechanism that controls an operation of the gas generator to start expansion of the expandable object after start of ejection of the expandable object by the ejection apparatus.

2. The aerial vehicle safety apparatus according to claim 1, wherein
    the bag-shaped member includes a plurality of tubular portions formed radially or in grids.

3. The aerial vehicle safety apparatus according to claim 1, wherein
    the expandable object has a two-dimensionally elongated shape in the expanded state, and
    the bag-shaped member is disposed to extend along a longitudinal direction of the expanded expandable object.

4. The aerial vehicle safety apparatus according to claim 1, wherein
    the expandable object includes a wing-shaped member containing a plurality of air chambers and a plurality of air inlets provided in a front portion so as to correspond to respective ones of the plurality of air chambers, and
    the bag-shaped member is disposed inside or outside the expandable object as extending along a portion of the expandable object where the plurality of air inlets are provided.

5. The aerial vehicle safety apparatus according to claim 1, wherein
the gas generator is of an explosive type containing an igniter,
the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent, and
the control mechanism includes the delay charge.

6. An aerial vehicle comprising:
an airframe;
a propulsive mechanism provided in the airframe, the propulsive mechanism propelling the airframe; and
the aerial vehicle safety apparatus according to claim 1, the aerial vehicle safety apparatus being attached to the airframe.

7. An aerial vehicle safety apparatus attachable to an aerial vehicle comprising:
an expandable object that is wound or folded in a non-expanded state, the expandable object being capable of generating at least one of lift and buoyancy in an expanded state;
an ejection apparatus coupled to the expandable object with a coupling member being interposed, the ejection apparatus being configured to eject the non-expanded expandable object into air; and
a shape restorable member provided in the expandable object, the shape restorable member being wound or folded together with or separately from the non-expanded expandable object and being configured to expand the non-expanded expandable object by restoring an initial shape by elastic force or shape resilience owing to shape memory, wherein
the shape restorable member includes a shape memory member that restores an original shape by being heated, and
the aerial vehicle safety apparatus further comprises a gas generator that heats the shape restorable member by making use of thermal energy generated at time of activation.

8. The aerial vehicle safety apparatus according to claim 7, further comprising a control mechanism that controls an operation of the gas generator to start expansion of the expandable object after start of ejection of the expandable object by the ejection apparatus.

9. The aerial vehicle safety apparatus according to claim 8, wherein
the gas generator is of an explosive type containing an igniter,
the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent, and
the control mechanism includes the delay charge.

10. An aerial vehicle comprising:
an airframe;
a propulsive mechanism provided in the airframe, the propulsive mechanism propelling the airframe; and
the aerial vehicle safety apparatus according to claim 7, the aerial vehicle safety apparatus being attached to the airframe.

11. An aerial vehicle safety apparatus attachable to an aerial vehicle comprising:
an expandable object that is wound or folded in a non-expanded state, the expandable object being capable of generating at least one of lift and buoyancy in an expanded state;
an ejection apparatus coupled to the expandable object with a coupling member being interposed, the ejection apparatus being configured to eject the non-expanded expandable object into air;
a shape restorable member provided in the expandable object, the shape restorable member being wound or folded together with or separately from the non-expanded expandable object and being configured to expand the non-expanded expandable object by restoring an initial shape by elastic force or shape resilience owing to shape memory, wherein
the shape restorable member includes an elastic member,
the aerial vehicle safety apparatus further comprises a locking member that maintains the shape restorable member in a wound or folded state, and
the shape restorable member restores the initial shape by cancellation of locking of the shape restorable member by the locking member by application of external force or energy;
a gas generator that cancels locking of the shape restorable member by the locking member by making use of a gas pressure generated at time of activation or thermal energy generated at the time of activation; and
a control mechanism that controls an operation of the gas generator to start expansion of the expandable object after start of ejection of the expandable object by the ejection apparatus.

12. The aerial vehicle safety apparatus according to claim 11, wherein
the gas generator is of an explosive type containing an igniter,
the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent, and
the control mechanism includes the delay charge.

13. An aerial vehicle comprising:
an airframe;
a propulsive mechanism provided in the airframe, the propulsive mechanism propelling the airframe; and
the aerial vehicle safety apparatus according to claim 11, the aerial vehicle safety apparatus being attached to the airframe.

* * * * *